(12) United States Patent
Sidhu et al.

(10) Patent No.: US 8,398,476 B1
(45) Date of Patent: *Mar. 19, 2013

(54) ELECTRONIC GAME, SUCH AS A COMPUTER GAME INVOLVING REMOVING PEGS

(75) Inventors: Sukhbir Sidhu, Seattle, WA (US); Brian Rothstein, Seattle, WA (US); Eric Tams, Seattle, WA (US)

(73) Assignee: PopCap Games, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/346,812

(22) Filed: Jan. 10, 2012
(Under 37 CFR 1.47)

Related U.S. Application Data

(63) Continuation of application No. 12/024,604, filed on Feb. 1, 2008, now Pat. No. 8,128,476.

(60) Provisional application No. 60/888,063, filed on Feb. 2, 2007.

(51) Int. Cl.
*A63F 9/24* (2006.01)
*A63F 13/00* (2006.01)
*G06F 17/00* (2006.01)
*G06F 19/00* (2011.01)

(52) U.S. Cl. .................. 463/16; 463/23; 463/31
(58) Field of Classification Search .......... 463/16
See application file for complete search history.

(56) References Cited

U.S. PATENT DOCUMENTS

| | | |
|---|---|---|
| 7,169,044 B2 | 1/2007 | Baerlocher et al. |
| 7,267,341 B2 | 9/2007 | Shah |
| 7,402,104 B2 | 7/2008 | Ogita et al. |

OTHER PUBLICATIONS

"Arkanoid," 1986, Taito, manual, 12 pages.
"Katamari Damacy," Sep. 22, 2004, Namco, manual, 18 pages.
"The Sims Carnival™ BumperBlast," Electronic Arts, 5 pages.
Amazon.com, "Cranium Bumparena," http://www.amazon.com/Cranium-103040000-100E-Bumparena/dp/B000930CSI, Product reviewed Nov. 26, 2006, 13 pages [Internet accessed on Aug. 5, 2008].
Boardgamegeek.com, "Cranium Bumparena," http://www.boardgamegeek.com/game/17962, 2005, 5 pages [Internet accessed on Aug. 5, 2008].
GamersInfo.net, Brickbreaker for Blackberry, http://www.gamersinfo.net/articles/1214-brickbreaker-for-blackberry, Product reviewed Aug. 8, 2006, 6 pages [Internet accessed on Aug. 4, 2008].
Peggle (Trackball, v1.0)—MAME ROM, Strata/incredible Technologies, 1991, 2 pages.
Peggle, Strata Group, Inc., 1991, 1 page.
Peggle, Videogame, Strata/Incredible Technologies, 1991, 3 pages.
System16.com, "Peggle," Strata / Incredible Technologies, 1991, http://www.system16.com/hardware.php?id=805&page=1, pp. 2, 9, and 10 of 14 [Internet accessed on Aug. 4, 2008].
Wikipedia.org, "Arkanoid," http://en.wikipedia.org/wiki/Arkanoid, Developed in 1986, 4 pages [Internet accessed on Aug. 4, 2008].
Wikipedia.org, "Breakout (arcade game)," http://en.wikipedia.org/wiki/Breakout_%28arcade_game%29, Released May 13, 1976, 6 pages [Internet accessed on Aug. 4, 2008].

*Primary Examiner* — Michael Cuff
*Assistant Examiner* — Kevin Y Kim
(74) *Attorney, Agent, or Firm* — Perkins Coie LLP

(57) ABSTRACT

Peggle is a game that balances skill and luck. The Peggle board is made up of different types of pegs, some of which the player must clear. The player begins a turn by aiming a ball at the pegs. When the player releases the ball, the ball travels through the pegs, contacting some and eventually falling to the bottom of the board. The ball may bounce off many pegs, and those pegs that the ball contacts are removed. A score is calculated based on the number and types of pegs hit during a turn.

20 Claims, 11 Drawing Sheets
(8 of 11 Drawing Sheet(s) Filed in Color)

ELECTRONIC GAME, SUCH AS A COMPUTER GAME INVOLVING REMOVING PEGS

CROSS REFERENCE TO RELATED APPLICATION(S)

This application is a continuation of U.S. patent application Ser. No. 12/024,604, filed on Feb. 1, 2008 now U.S. Pat. No. 8,128,476, entitled "ELECTRONIC GAME, SUCH AS A COMPUTER GAME INVOLVING REMOVING PEGS," which claims the benefit of U.S. Provisional Application No. 60/888,063, filed on Feb. 2, 2007, entitled "ELECTRONIC GAME, SUCH AS A COMPUTER GAME INVOLVING REMOVING PEGS," each of which is incorporated herein in its entirety by reference.

BACKGROUND

Video games are a popular way for people to entertain themselves and interact with other users. Whether implemented on a personal computer, television-based gaming console, or handheld gaming system, traditional video games allow users to manipulate on-screen characters or elements and thereby engage in on-screen challenges or competitions. Computer generated challenges and competitions can be rich with stimulating content that is more dynamic and inspiring than an unchanging toy car or truck.

Perhaps the most visible benefit of video gaming is its artistic and entertainment contributions. As a form of multimedia entertainment, modern video games contain a highly unique fusion of 3D art, computer-generated (CG) effects, architecture, artificial intelligence (AI), sound effects, dramatic performances, music, storytelling, and, most importantly, interactivity. This interactivity enables the player to explore environments that range from simulated reality to stylized, artistic expressions (something no other form of entertainment can allow). In this respect, every game scenario will play out a slightly different way every time. Even if the game is highly scripted, this can still feel like a large amount of freedom to the person who is playing the game.

A related property is that of emergent behavior. While many games including card games and sports rely on emergent principles, video games commonly present simulated story worlds where emergent behavior occurs within the context of the game. This is something that some gamers find appealing as it introduces a certain level of randomness to a game. Generally any place where you have event driven instructions for AI in a game, you will inevitably see this. For instance, take a racing game where cars are programmed to avoid crashing and they encounter an obstacle in the track, the cars might then maneuver to avoid the obstacle causing the cars behind them to slow and/or maneuver to accommodate the cars in front of them and the obstacle. The programmer never wrote code to specifically create a traffic jam; yet one now exists in the game.

In Steven Johnson's book, "Everything Bad Is Good for You," he argues that video games in fact demand far more from a player than traditional games like Monopoly. In order to experience the game, players must first determine the objectives, as well as how to complete them. They must then learn the game controls and how the human-machine interface works, including menus and heads-up displays (HUDs). Beyond such skills, which after some time become quite fundamental and are taken for granted by many gamers, video games are based upon the player navigating (and eventually mastering) a highly complex system with many variables. This requires a strong analytical ability, as well as flexibility and adaptability. To emphasize the point, Johnson notes that the strategy guide for Grand Theft Auto III is 53,000 words long. He argues that the process of learning the boundaries, goals, and controls of a given game is often a highly demanding one that calls on many different areas of cognitive function. Indeed, most games require a great deal of patience and focus from the player, and, contrary to the popular perception that games provide instant gratification, games actually delay gratification far longer than other forms of entertainment such as film or even many books. Some research suggests video games may even increase player's attention capacities.

Multiplayer games, which take advantage of the fact that computer games can use the Internet, provide players with the opportunity to compete with other players from across the globe, something that is also unique to electronic gaming. Millions of players around the globe are attracted to video gaming simply because it offers such unprecedented ability to interact with large numbers of people engaged simultaneously in a structured environment where they are all involved in the same activity (playing the game).

Even simple games offer potential benefits to the player. Games like Tetris and Pac-man are well-designed games that are easy to pick up but difficult to master, much like chess or even poker. Despite their simplicity, simple games may also feature online capabilities or powerful AI. Depending on the game, players can develop and test their techniques against an advanced computer player or online against other human players.

Overall, there is a need for a new game that offers the benefits discussed above to game players, as well as one that provides additional benefits.

The patent or application file contains at least one drawing executed in color. Copies of this patent or patent application publication with color drawings will be provided by the U.S. Patent and Trademark Office upon request and payment of the necessary fee.

DETAILED DESCRIPTION

Figure 1:
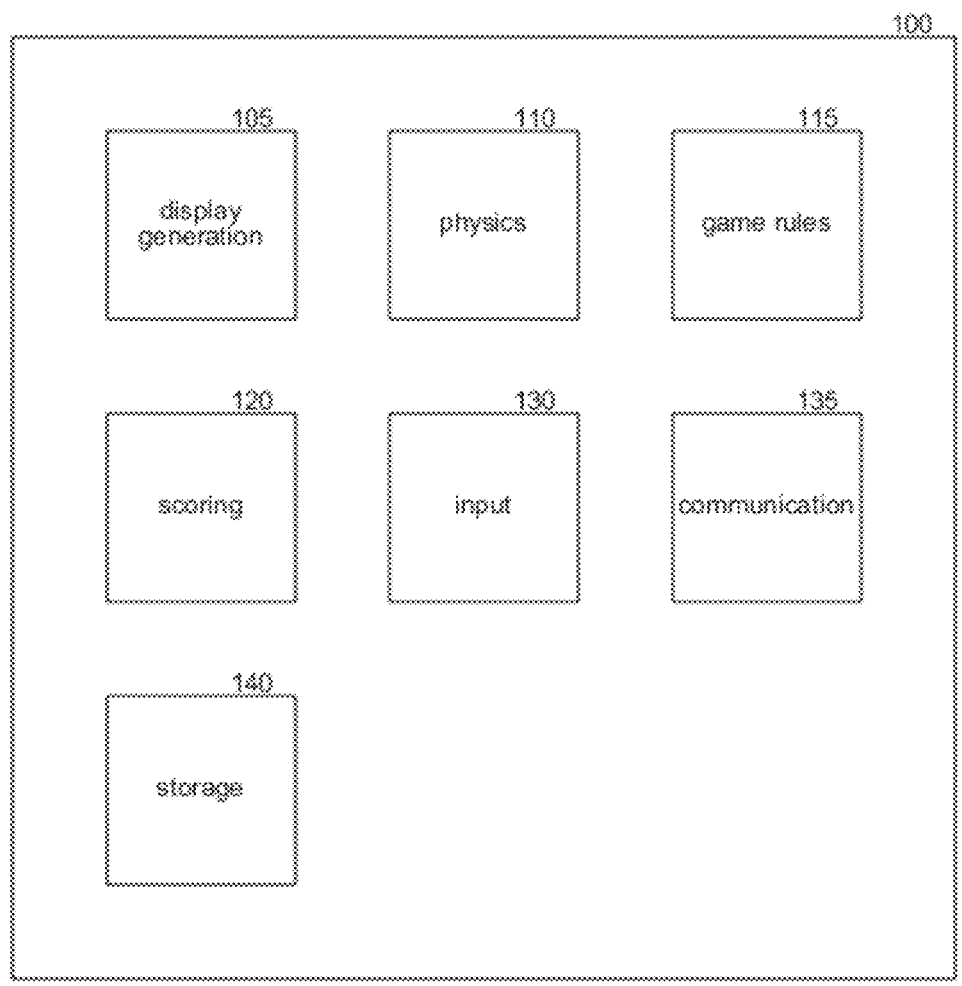
FIG. 1 is a block diagram that illustrates components of a Peggle game system.

The headings provided herein are for convenience only and do not necessarily affect the scope or meaning of the claimed invention.

Overview

Peggle is a game that balances skill and luck. The Peggle board is made up of different types of pegs, some of which the player must clear. The player begins a turn by aiming a ball at the pegs. When the player releases the ball, the ball travels through the pegs, contacting some and eventually falling to the bottom of the board. The ball may bounce off many pegs, and Peggle removes certain pegs that the ball contacts. The player may not need to remove all of the pegs. For example, the Peggle board may contain orange pegs and blue pegs, and the player may complete a board or level by removing all of the orange pegs. Pegs are typically round and small in relation to the ball, such that the ball can travel freely between the pegs. However, some pegs are rectangular, referred to below as bricks, and have more of an effect of blocking the path of the ball and reflecting the ball back into the board. A particular Peggle board can be made up of many combinations of peg types. For example, in one embodiment or variant of the game, the ball must contact some pegs twice before Peggle removes them from the board. Peggle may indicate different types of pegs to the player based on the color of the pegs. Peggle calculates a score based on the number and types of pegs hit during a turn. For example, Peggle may set a point value for removing each type of peg and may modify the point value based on the number of pegs removed in each turn. At the start of the board, there are many pegs surrounding the orange pegs, and a player's shots are based largely on luck as it is difficult to calculate the trajectory of the ball after the first few pegs that the ball contacts. Later, when the player has cleared more pegs, causing the ball to contact the remaining orange pegs to complete the board is largely based on skill and the ability of the player to cause the ball to go where the player wants it to go.

In some embodiments, Peggle does not remove pegs immediately when the ball contacts them, but instead lightens their hue so they appear as being "lit up." For example, Peggle may wait until the end of a turn to remove all of the pegs that the ball contacted during that turn. This can give the player a better sense of how many pegs the player removed during each turn. However, in some cases, the ball may become stuck and Peggle may remove a peg before the end of the turn to keep the ball in play. Peggle may also provide audible feedback to the player regarding how many pegs the player's shot contacted by playing a sound when the ball contacts each peg and increasing the pitch of the sound as the ball contacts more pegs.

In some embodiments, Peggle contains four colors of pegs and bricks, each having different properties. A blue peg is a normal peg that the player is not required to remove to complete a board, but removing blue pegs provides the player with additional points. An orange peg is a peg that the player must remove to complete the board, and may have a higher point value than a blue peg. A green peg is a peg that activates special abilities for the player when the player removes it. A purple peg is a special peg that has a higher point value than the other pegs. Peggle may base the point value of the purple peg on the total number of points received for removing each of the other pegs during a turn, or based on a multiple (e.g., 50×) of the value of the blue peg.

In some embodiments, pegs contain markings other than color to distinguish between different types of pegs. For example, Peggle may contain a setting for a colorblind player that provides hash marks or other markings to differentiate the peg colors described above. Peggle may also use a peg's markings to distinguish the behavior of the peg when the ball contacts it. For example, in one embodiment of the game, a peg with a ball symbol on it may indicate that removing that peg will earn the player a free ball.

In some embodiments, Peggle randomly selects the location of the orange pegs each time a player plays a particular level. This provides variety to players repeating a level and makes it more difficult to memorize the best shots to clear a particular level. Both the layout of the pegs on the board may change and the arrangement of orange pegs with respect to other pegs. Alternatively, Peggle presents pre-set arrangements of pegs, but randomly picks which ones will be orange, green and purple. For example, one layout may evenly distribute all of the pegs on the board while placing more orange pegs towards the top of the board than the bottom.

In some embodiments, Peggle provides a series of characters that the user can select before starting a particular Peggle board. Each character may have a different ability that modifies the game play. The player may activate a character's ability by successfully removing a particular type of peg. For example, the character's ability may provide the player with better aim or cause an explosion with a large blast radius around the ball for removing more pegs. Alternatively or additionally, special abilities may be associated with particular pegs rather than particular characters, such that a user can earn the special ability by removing a particular peg rather than selecting a particular character before starting a board.

In some embodiments, Peggle adds an artistic backdrop to the Peggle board based on the arrangement of the pegs. For example, a backdrop containing a picture of a car may have pegs arranged along the outline of the car and in a circle around the wheels. Pegs may also move. For example, if Peggle has arranged some pegs in a circle around the wheel of the car as in the previous example, then those pegs may rotate like a wheel. This adds difficulty to the game as the player must time her shot to hit certain pegs.

In some embodiments, Peggle limits the number of balls provided to a player for completing a Peggle board. For example, the player may be provided with 10 balls for completing each Peggle board. If the player exhausts the provided balls without clearing all of the pegs necessary to complete the board, then the player fails to complete the board and may try to complete the board again. The player may also be able to earn additional balls for completing a particular board by performing various feats. For example, the player may earn an additional ball by removing a particular type of peg or by getting the ball to travel to a particularly difficult area.

In some embodiments, the ball travels from the top of the board to the bottom of the board. For example, a player may release the ball from a "gun," or suitable shooting or launching device/element at the top of the board and fall due to the effects of a gravitational force to the bottom of the board. However, those of ordinary skill in the art will recognize that there are many alternatives for the starting point and destination area for the ball. For example, Peggle may arrange the board such that the player releases the ball on the left side of the board and the ball travels to the right side of the board. As another example, the middle of the board can contain a drawing force, such as a virtual black hole, and the ball could be released anywhere along an outer ring.

In some embodiments, the point from which a player releases the ball is moveable. For example, the player may release the ball from the top of the board from a platform that can be scrolled from side to side. As another example, the player may fire the ball up from the bottom of the board from a similar scrolling platform. The point from which the player releases the ball may also rotate such that the player can fire the ball in many directions.

In some embodiments, the destination area to which the ball travels may contain a ball catcher. For example, if the ball travels from the top to the bottom of the board, the board may contain a bucket to catch the ball at the bottom of the board. The bucket may be fixed or moveable. If the bucket is moveable, the player may be able to control the movement or the bucket may move according to a pattern (e.g., side to side at a fixed speed). By successfully placing the ball in the ball catcher, the player may earn additional points or advantages in the game, such as an extra ball. In an alternative embodiment, Peggle may replace the bucket by a user-controlled or autonomous paddle or trampoline that bounces the ball back into play.

In some embodiments, the Peggle board contains obstacles that block the travel of the ball. For example, the board may contain a wall dividing the left and right sides of the board, such that the ball will not bounce from one side to the other as it contacts pegs. This adds additional challenge to the game as the player must devise a strategy to remove all of the pegs based on the obstacles. The Peggle board may also contain active obstacles that change the path of the ball. For example, a warp tunnel may relocate the ball to another part of the board when a ball falls within it. Peggle arranges some levels such that a player cannot remove certain pegs without using the warp tunnel to place the ball in the proper position. Other obstacles may move or provide extra bounce when the ball contacts them to add additional variety to the game play. Still further obstacles may prevent direct access to pegs and require that the player use another peg or bouncy surface to deflect the shot to hit the desired peg or to use a specific power up that will aid in hitting hard to reach pegs.

In some embodiments, Peggle may time levels or limit a player to a certain number of lives to use to complete a level. For example, the player may receive two lives to complete a level, and if the player fails, Peggle deducts one life. At the start of each life, the player may receive 10 balls to use to remove pegs. When the player is out of balls, if the player has not removed the pegs required to complete the level, then the player loses that life. If the player does not complete the level before all of the player's lives are gone, the player may have to start from the beginning of a series of boards. Similarly, Peggle may give the player a certain time in which to complete each level, and may penalize the player if the player cannot complete the board in the allotted amount of time. In timed modes, Peggle may give the player an unlimited number of balls to use during the allotted time, and may additionally award extra time via use of special pegs or meeting certain objectives.

In some embodiments, players create a user profile. When a player first launches Peggle, Peggle asks the player to enter a display name. Peggle saves the player's progress and high scores when the player quits. If there are several people playing on one computer, each player may create a separate profile.

The details of the system described above will now be illustrated with reference to the figures. Unless described otherwise below, aspects of the invention may be practiced with conventional systems. Thus, the construction and operation of the various blocks shown in FIG. 1 may be of conventional design, and need not be described in further detail herein to make and use the invention, because those skilled in the relevant art will understand such blocks. One skilled in the relevant art can readily make any modifications necessary to the blocks in FIG. 1 (or other embodiments or figures) based on the detailed description provided herein.

FIG. 1 is a block diagram that illustrates components of the Peggle game system, in one embodiment. The Peggle game system 100 contains a display generation component 105, a physics component 110, a game rules component 115, a scoring component 120, an input component 130, a communication component 135, and a storage component 140. The display generation component 105 draws game objects to a display device. For example, the display generation component 105 may display pegs and animate the ball on a computer screen. The physics component 110 determines the path that the ball travels throughout the game board and simulates the effects of the balls interactions with pegs and other elements of the game board. For example, the physics component 110 determines the amount of bounce that the ball experiences after contacting a peg based on modeling an elastic collision. The game rules component 115 enforces the rules of the game, such as the number of balls that Peggle provides a player with per board. The scoring component 120 calculates the player's score based on each shot, and determines the player's overall score for each level and for the entire game. The input component 130 receives input from the player indicating where to fire the ball, when to fire the ball, and so on. The input component 130 may interact with hardware such as a mouse, keyboard, video game controller, motion capture device, and so on. The communication component 135 communicates with other instances of the game, such as during a multiplayer mode. The storage component 140 tracks a player's progress between game sessions. For example, the storage component 140 stores the players score so that the score is available the next time the player plays the game. The storage component 140 may also store replays or other capture data for sharing with other players.

FIG. 1 and the discussion herein provide a brief, general description of a suitable computing environment in which the invention can be implemented. Although not required, aspects of the invention are described in the general context of computer-executable instructions, such as routines executed by a general-purpose computer, e.g., a server computer, wireless device, or personal computer. Those skilled in the relevant art will appreciate that the invention can be practiced with other communications, data processing, or computer system configurations, including: gaming consoles, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "gaming device," and "console" are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

The Peggle game system may also be implemented in a gambling or casino environment. For example, the system may be part of an automatic gaming machine such as a slot machine or kiosk. The system may award money in place of points or may establish a conversion rate between points and money. The system may also award points based on certain achievements such as finishing a level, accomplishing a particularly difficult shot, and so forth. In addition, the odds of receiving a monetary award may be adjustable (e.g., by an administrator), such as to comply with governmental gaming regulations related to odds. These adjustments may affect, for example, the likelihood of receiving particular desirable layouts of pegs on the game board. Moreover, gaming machines may be networked such that multiple players can interact (e.g., competitively or cooperatively) or share a gaming experience (e.g., a chance to win a pool of money). Those of ordinary skill in the art will recognize that the system can be easily adapted to these and other environments.

Figure 2:
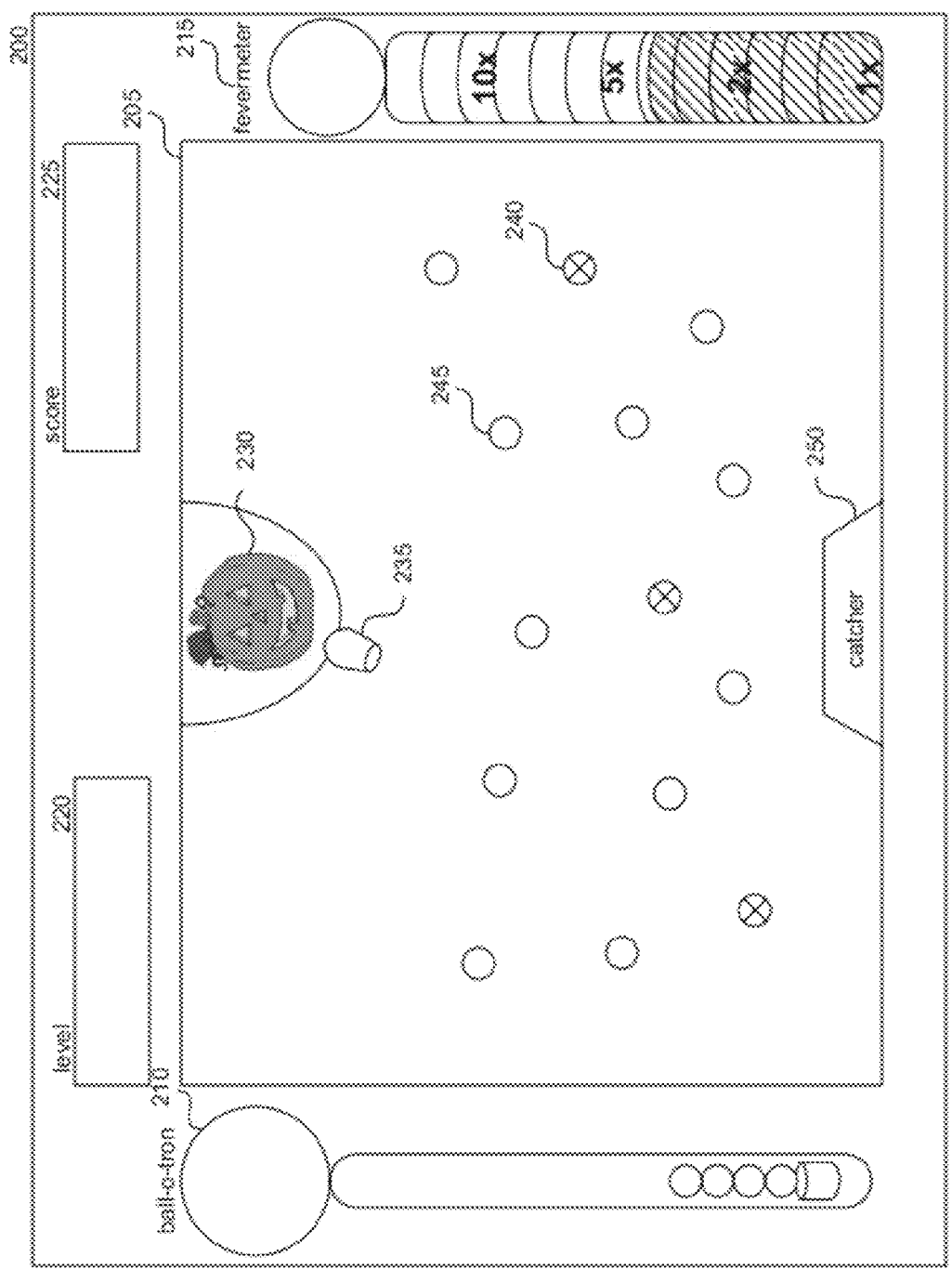
FIG. 2 illustrates an example display produced by a display generation component.

FIG. 2 illustrates an example display produced by the display generation component, in one embodiment. The display 200 contains a Peggle board 205, a Ball-o-Tron 210, a Fever Meter 215, a level information area 220, and a score information area 225. The Ball-o-Tron 210 indicates how many balls the player has remaining to complete the current level, and may provide a visual indicator of how many points the player is earning during a shot. In some embodiments, Peggle may place a Shot Meter containing a vertical bar near the Ball-o-Tron that indicates the success of a shot and if the player accumulates enough points to move the bar to the top, the player may earn a free ball. The Fever Meter 215, described in further detail below, indicates the multiplier that Peggle is currently applying to the player's score based on past shots. The level information area 220 displays information about the current level, such as the level's name, the number of unsuccessful attempts, the difficulty of the level, and so on. The score information area 225 displays the player's current score, and may break score information into scores for the last shot, the current level, and an overall score. During some game modes (e.g., Duel), the areas 220 and 225 may display different information, such as the player name, remaining balls, and current score. The Peggle board 205 contains a character indicator 230, a ball launcher 235, various types of pegs 240 and 245, and a ball catcher 250. The character indicator 230 indicates the character currently selected by the player, described below. The selected character may determine the effect of the ball hitting some types of pegs. The player aims the ball launcher 235, which is where the ball starts out on the Peggle board 205. In FIG. 2, pegs having a plus "+" sign indicate orange pegs that must be removed to complete the level, such as peg 240. Other pegs, such as 245, indicate those pegs that provide the player with extra points but the player does not need to remove to complete the level. After the ball has traveled through the pegs to the bottom of the board, the ball may enter the ball catcher 250, or fall off the bottom of the board without entering the ball catcher. If the ball enters the ball catcher 250, then the player may receive extra points or a free ball.

Figure 3:
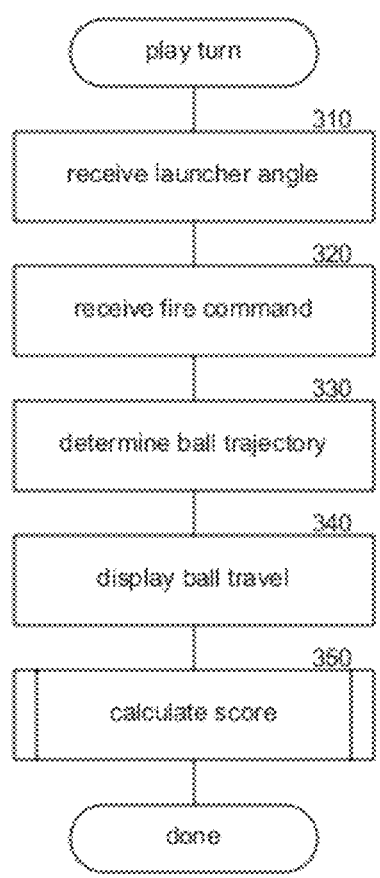
FIG. 3 is a flow diagram that illustrates the processing of the Peggle game system during the playing of a turn.
Figure 4:
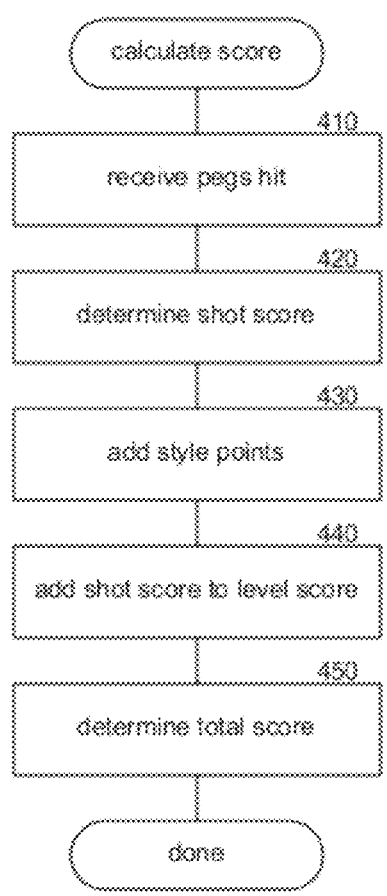
FIG. 4 is a flow diagram that illustrates the processing of a scoring component.

FIGS. 3-4 are representative flow diagrams that depict processes used in some embodiments. These flow diagrams do not show all functions or exchanges of data, but instead they provide an understanding of commands and data exchanged under the system. Those skilled in the relevant art will recognize that some functions or exchange of commands and data may be repeated, varied, omitted, or supplemented, and other (less important) aspects not shown may be readily implemented.

FIG. 3 is a flow diagram that illustrates the processing of the Peggle game system during the playing of a turn, in one embodiment. In step 310, the game receives input from the player indicating the position (e.g., an angle) of the ball launcher. In step 320, the game receives input from the player indicating that Peggle should fire the ball from the launcher. The timing of firing the ball may affect how the ball interacts with any moving elements of the Peggle board, such as a moving ball catcher or moving obstacles. In step 330, the game determines the trajectory of the ball using the physics component based on the position and time at which the player fired the ball. In step 340, the game displays the travel path of the ball using the display generation component. In step 350, the game calculates the player's score using the scoring component. After step 350, the turn is complete and these steps conclude.

FIG. 4 is a flow diagram that illustrates the processing of the scoring component, in one embodiment. Peggle invokes the component for each turn to compute the player's score based on the player's shot. In step 410, the component receives the number and type of pegs hit, as well as any information about the manner in which the pegs were hit (e.g., for stylistic shots). In step 420, the component determines the shot score for the current shot based on the type and number of pegs hit. In step 430, the component adds any style points to the shot score based on the player hitting the pegs in a particularly stylistic way. In step 440, the component updates the level score by adding the shot score to the previous level score. In step 450, the component updates the overall score by adding up all of the current level scores. In some embodiments, the values awarded for pegs may escalate as a player progresses through a level. For example, pegs hit later in the level may be worth more, since there are fewer of them and they require more skill to hit. This adds additional excitement to the game later in the level when there are fewer pegs available to hit. After step 450, these steps conclude.

EXAMPLE EMBODIMENT

The following paragraphs describe one embodiment for Peggle. Although specific values and game-play elements are described, those of ordinary skill in the art will recognize that many alternative embodiments can be achieved without deviating from the scope and spirit of the game. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Game Play

Peggle is a game where a player tries to hit 25 orange pegs with 10 metal balls. A player enrolls in the Peggle Institute, and ten Peggle Masters are ready to train the player in the skills, wonders, and mysteries of Peggle. The goal is to complete the full course of study at the Peggle Institute and earn the title of Peggle Master.

Peggle is played on a Peggle Board. The majority of the board is taken up by an array of pegs. At the top of the board is a Launcher, which the player controls. The player aims the Launcher by moving an input device (e.g., a mouse cursor or joystick), and fires a ball (e.g., by clicking the left mouse button or pressing a joystick button). Firing the Launcher shoots a Peggle ball that bounces around the board lighting up each peg it hits until falling off the bottom of the board. The lit pegs then disappear and the player can take another shot as long as there are still balls remaining. The player begins each level with ten balls. The player lights up the 25 orange pegs scattered randomly around the board to complete the level and achieve Extreme Fever, a period that indicates successful completion of the level and a chance to earn bonus points.

To control Peggle, the player aims the Launcher to the point where he wants the ball to go, and then fires a Peggle ball. The ball will head to where the Launcher was aimed when the player fired. The player may be able to hold down a button on the input device any time the ball is not in play to speed up the motion of the Free Ball Bucket and any moving pegs. This is helpful when waiting for moving objects. The player may also be able to make small angle adjustments to the Launcher by using elements of the input device (e.g., the mouse wheel or the left and right arrow keys). This is useful for getting the exact shot that the player wants.

Pegs can be round or rectangular. If rectangular, they are sometimes called bricks. Pegs come in four colors. Blue (Standard peg) pegs make up the vast majority of the pegs on the board and have a base value of 10 points. Orange (Goal peg) pegs must all be lit in order to complete a level and have a base value of 100 points (10× blue). There are 25 orange pegs per level. Purple (Point peg) pegs are worth 50× the value of the blue pegs. There is one purple peg per turn and its location changes every shot. Purple pegs appear for the first time on the fourth level and have a base value of 500 points (50× blue). Green (Magic peg) pegs activate a Peggle Magic Power, either immediately or on the next shot (see below). There are two green pegs per level starting on the third level. Green pegs have a base value of 10 points (1× blue).

On the left side of the Peggle Board is the Ball-o-Tron. The number at the top of the Ball-o-Tron shows how many balls the player has left, and the balls themselves sit it the hopper underneath. The Ball-o-Tron may also indicate the strength of a particular shot and how close the player is to earning bonuses (e.g., a free ball). The player begins each level with 10 balls: nine in the Ball-o-Tron and one pre-loaded in the Launcher at the top of the board.

On the right side of the Peggle Board is the Fevermeter. As the player eliminates orange pegs, the Fevemeter lights up. As the player hits certain points on the Fevermeter, a score multiplier takes effect that increases the point value of the pegs (see scoring below).

Figure 5:
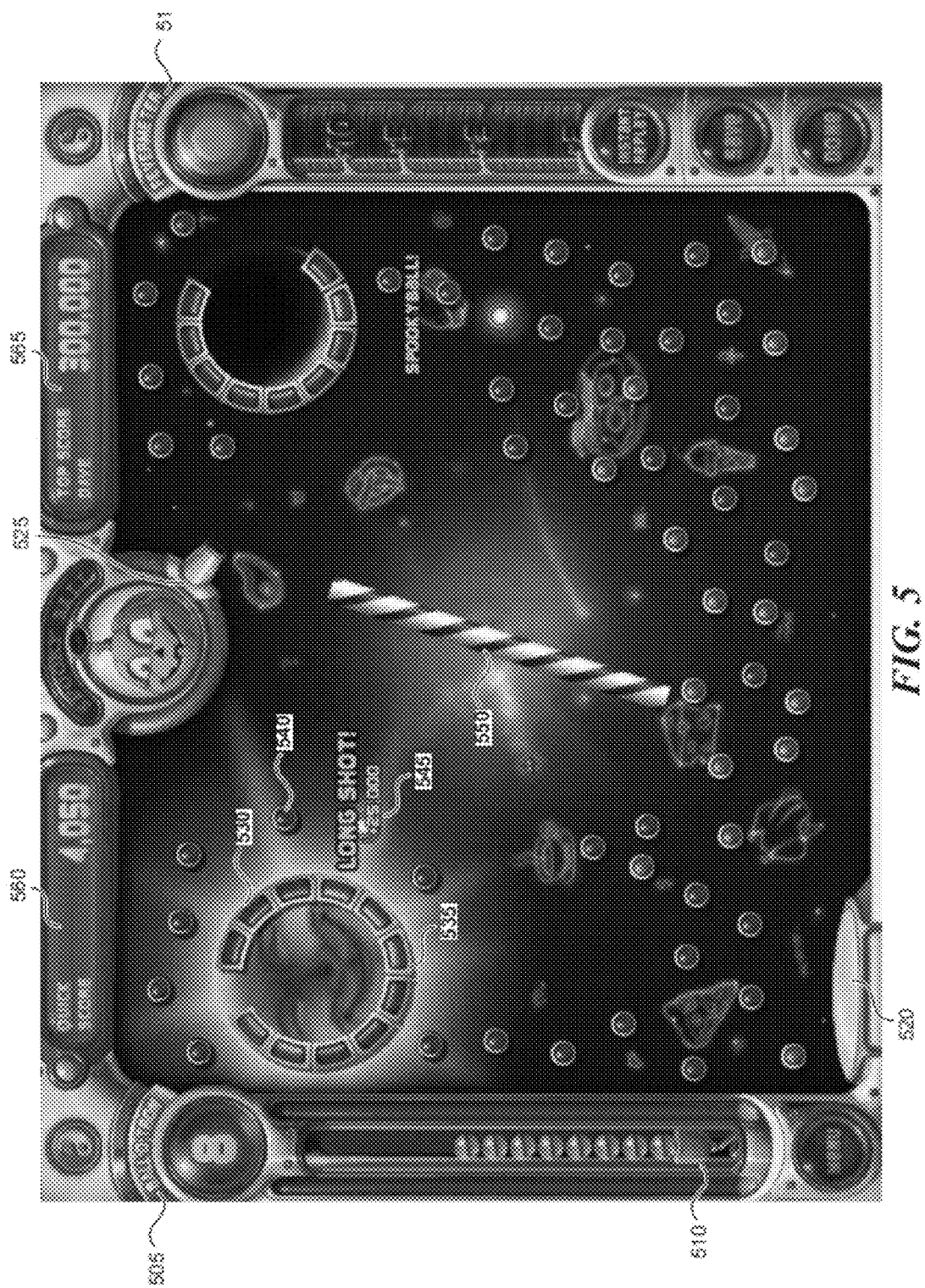
FIG. 5 is a screenshot of a display generated by the game system showing elements of the game.

FIG. 5 is a screenshot of a display generated by the game system showing elements of the game, in one embodiment. The display contains a Ball-o-Tron 505 that indicates the number of balls remaining. The sides of the Ball-o-Tron 505 contain a Shot Meter 510 that indicates how close the player is to earning a free ball. The right side of the display contains the Fevermeter 515 that indicates the current multiplier Peggle will apply to the player's shot score. The bottom of the display contains a ball catcher 520 into which the ball can fall to earn the player a free ball. The top of the display contains a current score 560 and a high score 565. The Peggle board contains bricks of several types. For example, an orange brick 535 is shown, as is a blue brick 530. The bricks may rotate to add additional difficulty to hitting the desired bricks. The Peggle board also contains pegs of several types. There are blue pegs 540, orange pegs 545, and green pegs 555. The player must remove the orange pegs and bricks to complete the level. The blue pegs add extra points to the player's score. The green peg activates the special power of the player's character. The Peggle board also contains an obstacle 550 that the player has to shoot balls around to hit the desired pegs. The obstacle may move, such as rotating on its center axis, to add additional difficulty to the level.

Figure 6A:
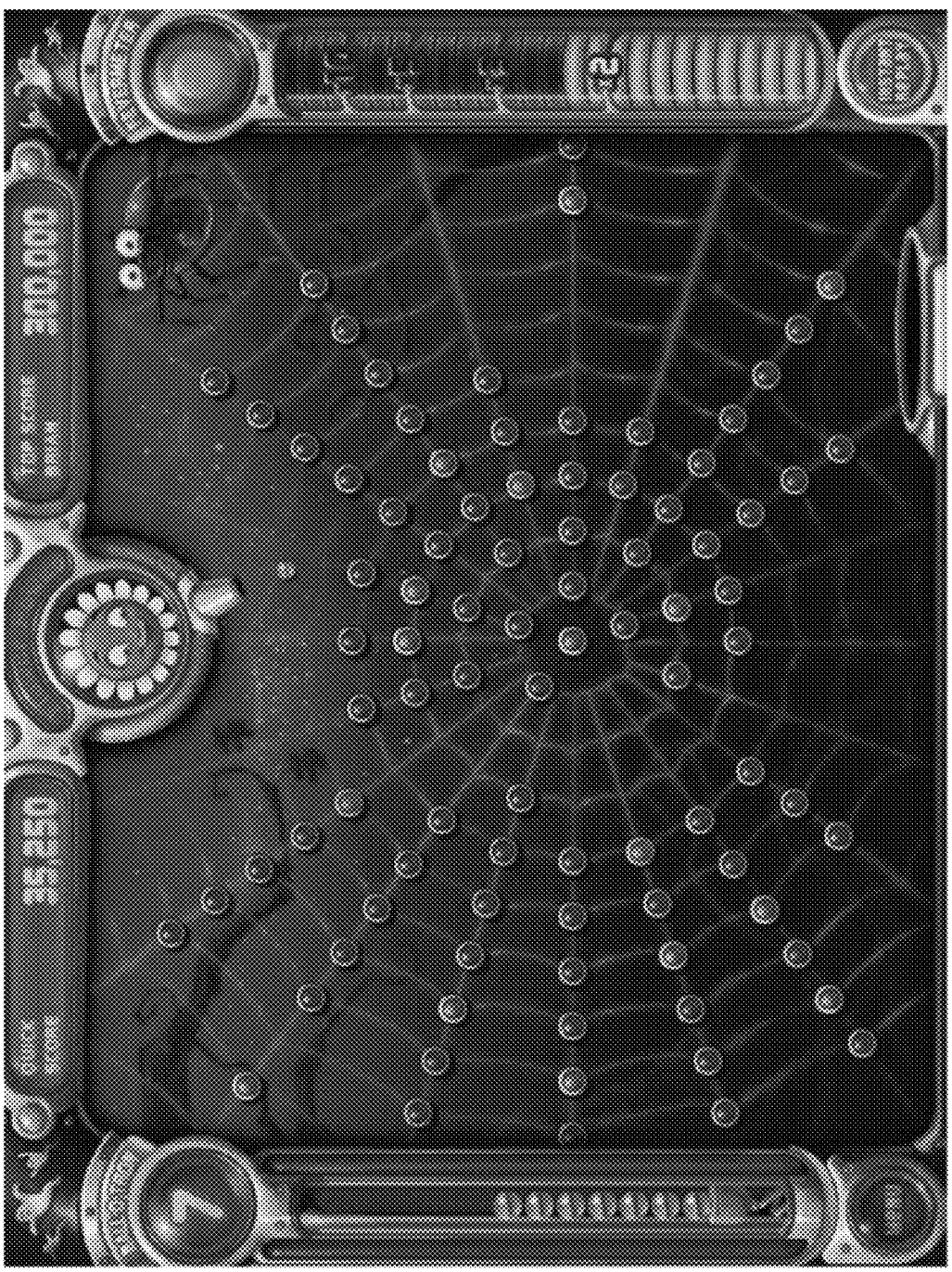
FIGS. 6A-6D are screenshots of a display generated by the game system at several points in time of a single turn.
Figure 6B:
Figure 6C:
Figure 6D:

FIGS. 6A-6D are screenshots of a display generated by the game system at several points in time of a single turn. In FIG. 6A, the ball has left the launcher and is headed towards the layout of pegs. In FIG. 6B, the ball has contacted several pegs, one of which is a green peg that activated the Flower Power of the player's chosen character. The Flower Power causes Peggle to remove orange pegs in addition to those contacted by the ball, and scores are shown for each of the removed pegs. The Fevermeter on the right illustrates how the multiplier has increased based on the player's shot. FIG. 6C shows the player earning a Free Ball by getting the ball to fall into the ball catcher. The Ball-o-Tron on the left side also shows the Free Ball that the player earned. FIG. 6D shows the final score calculation for the shot based on 20 pegs being removed.

Figure 7:
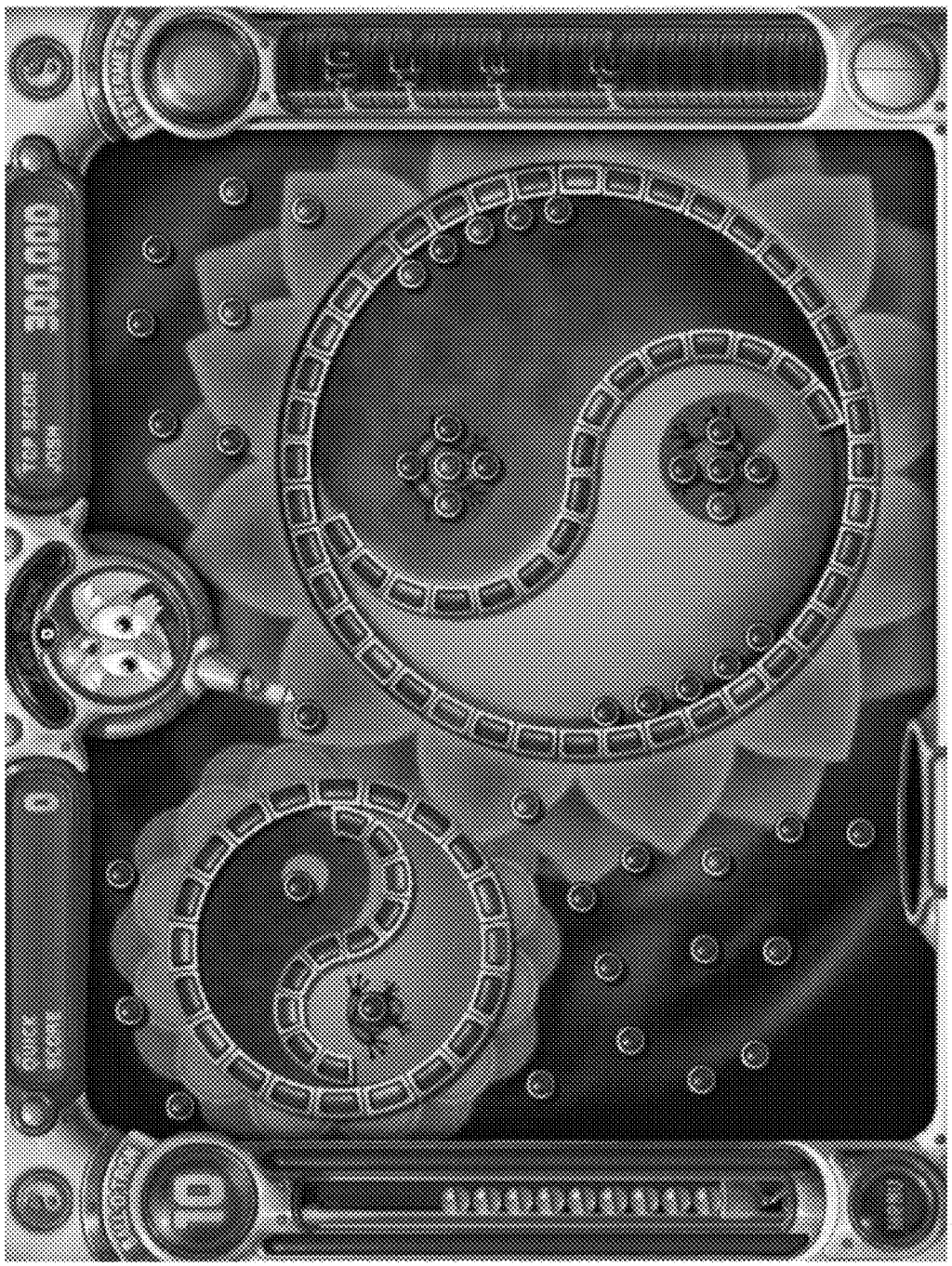
FIG. 7 is a screenshot of a display generated by the game system illustrating the background.

FIG. 7 is a screenshot of a display generated by the game system illustrating the background. The pegs in the figure are laid out in a way that matches with the background art. For example, the bricks are laid out in a circle around the out edge of the flower in the background.

Figure 8:
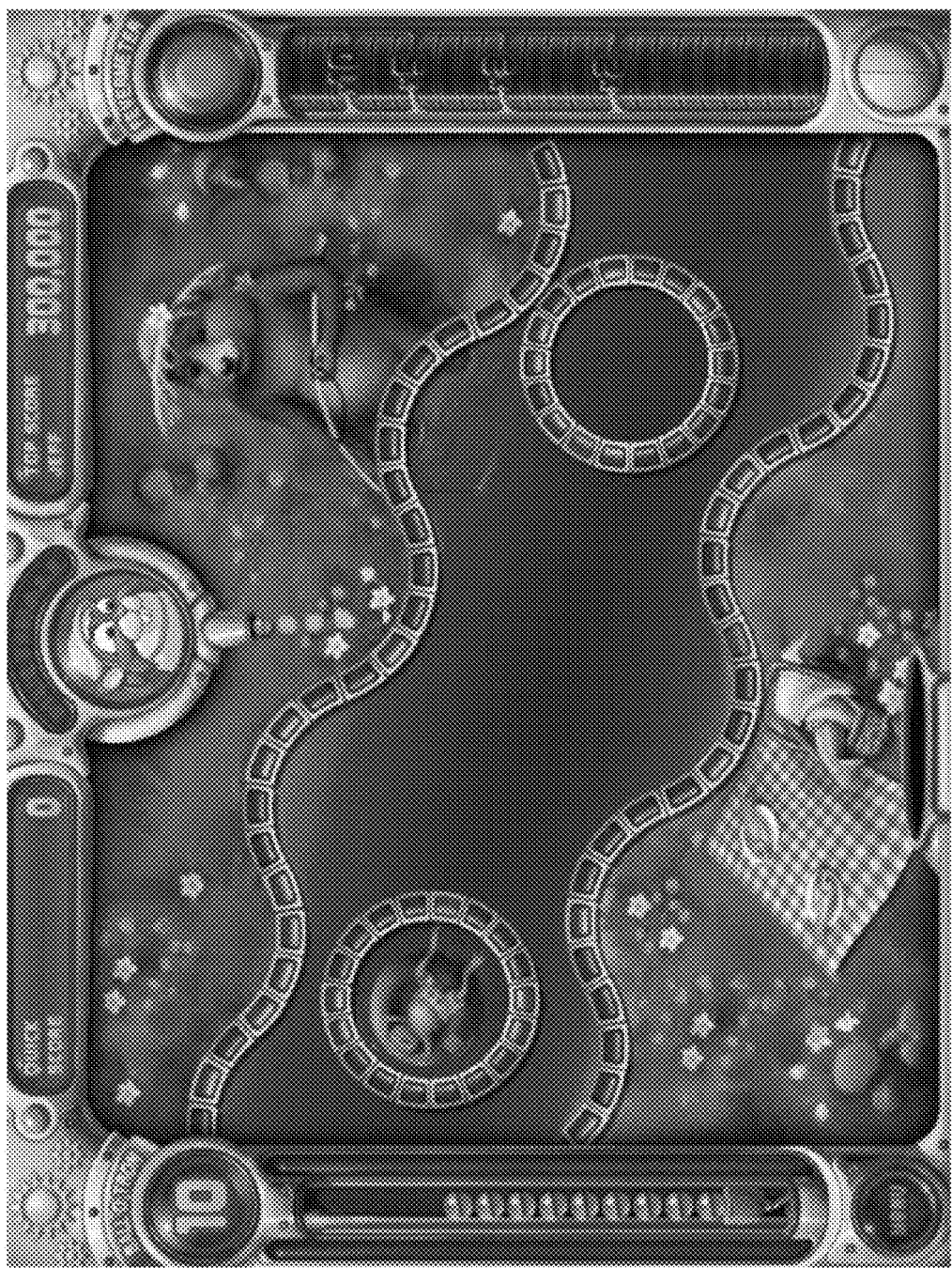
FIG. 8 is a screenshot of a display generated by the game system showing a level with many bricks.

FIG. 8 is a screenshot of a display generated by the game system showing a level with many bricks. As shown in the figure, there are no round pegs, only bricks. The bricks are laid out in a variety of patterns, such as in a wavy pattern along the edge of the river in the background.

Free Balls

Though the player begins each level with 10 balls, there are several ways to earn Free Balls during play. A Free Ball Bucket moves back and forth across the bottom of the board. If the ball lands in the Bucket, it will be returned to the Ball-o-Tron for another shot. A player can speed up the Free Ball Bucket's motion while the ball is not in play (e.g., by holding down the right mouse button), but once the ball is released from the Launcher the player cannot directly control the Free Ball Bucket. The player can, however, time her shot so that it has a greater chance of hitting the Free Ball Bucket. This is a key skill. It is also possible to time a shot so that it hits the side of the Free Ball Bucket and bounces back into play. This can be an essential skill for hitting hard to reach pegs.

Another way to earn a Free Ball is by achieving a 25,000 Shot Score. As the ball bounces down the board it earns points for the shot (see Scoring, below). As the shot score rises the glass tubes on the sides of the Ball-o-Tron begin to fill up with green light. The green light reaches the top once the shot score reaches 25,000 points, and Peggle awards the player a Free Ball. If a shot score reaches 25,000 points and continues to climb, the Ball-o-Tron tubes will begin to fill with purple light. If the shot score reaches 75,000 points, Peggle awards the player a second Free Ball. If a shot score reaches 75,000 points and continues to climb, the Ball-o-Tron tubes will begin to fill with yellow light. If the shot score reaches 125,000 points, Peggle awards the player a third Free Ball. Finally, if a player does not hit any pegs on a shot, the Free Ball coin spins and the player may be awarded a Free Ball.

Extreme Fever

Hitting the last orange peg on a level completes the level and activates Extreme Fever. The display zooms in on the ball, time slows down, and the words "Extreme Fever" zestfully appear. You can click the left mouse button to end slow-motion mode and return to normal speed. Blue and green pegs struck after the player activates Fever earn 1,000 points each. Hitting a purple peg after Fever earns 10,000 points. After activating Fever, the ball will continue on its way until falling into one of five bonus point areas that appear on the bottom of the board; from left to right their values are 10,000, 50,000, 100,000, 50,000, and 10,000. If the player clears all the pegs on a level (as opposed to only all the orange pegs), the player will activate Ultra Extreme Fever. In that case, all the five bonus point areas will award 100,000 points, and the player will win a special All Pegs Cleared ribbon for that level. These values may be altered in some game modes (e.g., halved for Duel). There is a secret rank of Peggle Mastery, called Extreme Grand Master, awaiting a player who can get All Pegs Cleared ribbons for every Peggle board.

Peggle Masters and Magic Powers

The Masters watch your play from above the Launcher, and each of them has a special Magic Power that is activated when a player hits a green peg. Some Magic Powers activate immediately, while others take effect on the next shot. The number above the Peggle Master's head shows how many shots remain on the Magic Power. Following are examples of Peggle Masters and their Magic Powers.

---
Super Guide Power

Master: Bjorn Unicorn
Effect: The Super Guide greatly extends the aiming line to show the path the ball will take through one bounce. Note that the ball does not travel in a straight line; instead, its path is curved because of the effect of gravity on the ball's motion. Use the Super Guide to get a sense of exactly how you should place your mouse cursor to get a specific shot. Though not as flashy as some of the later Magic Powers, mastering the Super Guide is the foundation of all Peggle skill.
Activation: Takes effect on next shot.
Duration: Three shots.
Multiball Power Master: Jimmy Lightning
Effect: The Multiball Magic Power spawns a second ball from the green peg. If the green peg is hit on the right side then the Multiball will pop out on the left side, and vice versa. Both balls continue to bounce around the board and both contribute to the shot score. Skillful (or lucky) use of the Multiball can add up to big points as well as two chances to land a ball in the Free Ball Bucket.
Activation: Takes effect immediately.
Duration: Lasts the length of the shot.

---
Pyramid Power

Master: Kat Tut
Effect: The Pyramid Power adds pyramid-like bumpers to the sides of the Free Ball Bucket. This dramatically increases the chance that a ball will bounce back up into play or fall into the bucket.
Activation: Takes effect immediately.
Duration: Five shots, including the activating shot.
Space Blast Power Master: Splork
Effect: The Space Blast creates an explosion that lights up all pegs within a certain radius (e.g., four pegs wide) from the green peg. This is useful for clearing whole areas of the board, and you can boost your shot score by waiting until you can catch the purple peg in a Space Blast.
Activation: Takes effect immediately.
Duration: Instant.
Flippers Power Master: Claude Lobster
Effect: Hitting the green peg causes two claw-like Flippers to appear at the lower left and right corners of the board. Flippers are used to pop the ball back up into play. Flip the Flippers by clicking the left mouse button. You can hold the Flippers in the flipped-up position by holding down the left mouse button; this is useful for trapping the ball with the Flippers to set up a good flip.
Activation: Takes effect immediately.
Duration: Three shots, including the activating shot.
Spooky Ball Power Master: Renfield Pumpkin
Effect: When the Spooky Ball is activated, the ball will drop out of the bottom of the board and reappear at the top for a second pass through the Peggle board. The Spooky Ball reappears at the same spot at the top as it left the bottom. Any pegs hit on the ball's second pass are added to the shot score. Used skillfully, the Spooky Ball can be one of the most effective point-earning Magic Powers in the game.
Activation: Takes effect immediately. Upon activation, the Free Ball Bucket is capped; the cap is removed once the Spooky Ball does its disappearing-reappearing act.
Duration: Lasts the length of the shot.
Flower Power Master: Tula Sunflower
Effect: The Flower Power will light up the closest one fifth (rounded up) of the remaining orange pegs whenever the green peg is hit. This is effective at clearing large numbers of orange pegs at once and helps to push up the point multiplier on the Fever Meter. Use the Flower Power early to maximize its effect, or hold off until the end of the level to light up particularly hard-to-reach orange pegs.
Activation: Takes effect immediately.
Duration: Instant.
Lucky Spin Power Master: Warren Rabbit
Effect: Hitting the green peg drops down the Lucky Spin wheel and gives it a spin. The wheel has four outcomes: Free Ball, Triple Score, Magic Hat, and a randomly chosen Magic Power. If the spinner lands on Free Ball, you are awarded a Free Ball. If the spinner lands on Triple Score, then the shot score will be tripled at the end of the shot, and the next shot will also have its shot score tripled. If the spinner lands on the Magic Hat, then the ball instantly acquires a top hat that bounces with the ball and lights up any pegs that it touches. If the spinner lands on the random Magic Power, then that power takes effect as it would normally, either instantly or on the next shot. If the player clicks on the Lucky Spin wheel while the spin is in motion, the spinner will instantly arrive at the spot it was going to reach, not necessarily the spot on the wheel where the player clicked.
Activation: Takes effect immediately.
Duration: Variable. Free Balls are awarded instantly. The Triple Score lasts for two shots, including the activating shot. The Magic Hat lasts for two shots, including the activating shot. The randomly chosen Magic Power lasts for as long as it normally would.
Fireball Power Master: Lord Cinderbottom
Effect: When the Fireball is activated, the Peggle ball is replaced by a burning sphere approximately 1.3× larger than a standard Peggle ball. The Fireball does not bounce when it hits a peg; instead, it burns a path through the board, lighting up and instantly eliminating any pegs it touches. The Free Ball Bucket is capped while the Fireball is active, allowing you to bounce -continued the Fireball off it to hit more pegs. The Free Ball Bucket cap disappears if the Fireball hits it.
Activation: Takes effect on the next shot.
Duration: Lasts for one shot.

Zen Ball Power

Master: Master Hu
Effect: When the Zen Ball is activated, Master Hu will consider a range of possible paths the ball could take on that shot and will nudge the ball to select the highest-scoring path, with additional weighting on dropping the ball in the Free Ball Bucket and lighting up orange pegs. Once you take the shot, Zen Ball will tell you how much it has improved your shot. "No improvement" means Zen Ball has not improved your shot. "Zen achieved" means your shot has been improved (by dropping the ball in the Free Ball Bucket, for instance) but not for additional points. "(Some Percentage) More Zen" means that your shot has been improved by the given percentage. "Maximum Zen" means your shot has been improved by more than 500% over the original shot.
Activation: Takes effect on next shot.
Duration: Lasts one shot.

Style Shots

Certain kinds of cool shots will earn special recognition and bonus points. These bonus points add to the player's overall level score but do not add directly to the player's shot score (and thus do not help in earning a Free Ball). All style shots require that you hit at least one peg. Following are example style shots.

Freeball Skills: Bounce ball directly from one (and only one) peg into the Free Ball Bucket. Points: 5,000 (2,500 in Duel Mode)
Long Shot: Hit a non-blue peg, travel approximately one-third the width of the screen, hit another non-blue peg next or soon after. Points: 25,000 (5000 in Duel Mode)
Super Long Shot: Hit a non-blue peg, travel approximately two-thirds the width of the screen, hit another non-blue peg next or soon after. Points: 50,000 (10,000 in Duel Mode)
Kick the Bucket: Bounce the ball off the Free Ball Bucket and hit the final orange peg for Fever. Points: 25,000 (5,000 in Duel Mode)
Lucky Bounce: Bounce the ball off the Free Ball Bucket for a certain amount
of time or ¼ the height of the screen, then catch the ball in the Free Ball Bucket. Points: 25,000 (2,500 in Duel Mode)
Mad Skillz: Have five balls in a row fall in the Free Ball Bucket. Points: 25,000 (5,000 in Duel Mode)
Crazy Mad Skillz: Have 10 balls in a row fall in the Free Ball Bucket. Points: 100,000 (10,000 in Duel Mode)
Extreme Slide: Slide for 12 pegs. Points: 50,000 (5,000 in Duel Mode)
Orange Attack: Given a number of orange pegs remaining, hit a certain number of orange pegs in a shot. For example, if five orange pegs are remaining, hitting 4 in one shot will earn Orange Attack. Points: 50,000 (5,000 in Duel Mode)
Cool Clear: Hit at least one peg, hit the final orange peg for Extreme Fever, then hit another peg to clear the board (and get Ultra Extreme Fever). Points: 50,000 (5,000 in Duel Mode)
Free Ball Exchange: Have a ball fall into the Free Ball Bucket (Duel Mode only). Points: 5,000 in Duel Mode In addition to these general style shots, there are also style shots that are specific to each Magic Power. Following are several examples.

Super Guide

Double Guide: Hit both green pegs in the same shot, resulting in the Super Guide being active for the next eight shots. Points: 25,000

Multiball

Triple Play: Hit both green pegs in the same shot, resulting in a three ball shot. Points: 25,000
Multiball Madness: Get the Multiball after hitting the final orange peg for fever. Points: 25,000 (5,000 in Duel Mode)
Free Ball Frenzy: Have more than one ball go into the Free Ball Bucket in one shot. Points: 100,000 (1 0,000 in Duel Mode)

Pyramid Power

Pyramid Pileup: Hit both green pegs in the same shot, resulting in the Pyramid being active for the next nine shots. Points: 25,000
Pyramid Pickup: Bounce a ball off the Pyramid bumpers and into the Free Ball Bucket. Points: 10,000 (5,000 in Duel Mode)

Space Blast

Big Bang: Light up both green pegs in the same shot, either by hitting them both with the ball or by catching one green peg in the Space Blast of the other. Points: 25,000

Flippers

Flip Out: Hit both green pegs in the same shot, resulting in Flippers being active for the next five shots. Points: 25,000
Flipper Maniac: Bounce off a Flipper and hit at least one peg; do this four times. Points: 25,000 (5,000 in Duel Mode)

Spooky Ball

Spooktacular: Hit both green pegs in the same shot, resulting in the Spooky Ball going around the screen twice. Points: 25,000

Flower Power

Petal to the Metal: two green pegs in the same shot, resulting in one-fifth of the remaining orange pegs lighting up each time. Points: 25,000

Lucky Spin

Spin Again: Hit both green pegs in the same shot, resulting in two spins of the Lucky Spin wheel. Points: 25,000
Hat Trick: Have a ball wearing the Magic Hat fall into the Free Ball Bucket. Points: 10,000 (2,500 in Duel Mode)

Fireball

Great Balls of Fire: Hit both green pegs in the same shot, resulting in the Fireball being active for the next two shots. Points: 25,000
Hot Stuff: Bounce a Fireball off the cap on the Free Ball Bucket, and then have the Fireball land in the Free Ball Bucket. Points: 25,000 (5,000 in Duel Mode)

Zen Ball

Zen Maniac: Hit both green pegs in the same shot, resulting in Zen Ball being active for the next two shots. Points: 25,000

For some style shots there is a chance that Jimmy Lightning will be so impressed he'll pop in on the lower left or right side of the board to say either "Extreme!", "Tubular!", "Radical!", "Awesome!", "Insane!", "Freak Out!", "Whoa . . . ", "Wicked!", "Mad Skills", "Excellent!", "Rock On!" or "Toasty!"

Replays

Instant replays are useful for reliving a player's favorite shots and showing them to friends and family. A player can activate the Instant Replay button on the bottom right of the screen to see a replay of his last shot. Players can right-click the Instant Replay button to enable an advanced mode in which the player can replay all shots for a game. During a replay, a player can hold down the left mouse button in the play area to activate slow motion. Holding down the right mouse button will activate fast forward. A player can save replays and view them later by clicking the Save button on the lower right side of the screen. This will bring up a dialog box that allows the player to enter a name for the shot. When the player is done watching a replay, the player clicks the Done button on the lower right corner of the screen. To view saved replays, a player clicks the Replay button on the Main Menu. A player can e-mail friends saved shots and receive saved shots from his friends.

Game Modes

In some embodiments, Peggle has four game modes: a sequential story mode (Adventure), a free-select arcade mode (Quick Play), a two-player competitive mode (Duel) and a special Challenge mode (Challenge). Some modes may not be available based on a player's progress through the game. For example, at the beginning of the game only Adventure Mode may be available and other modes may be unlocked as the player proceeds through the game. Following are examples of each mode. Those of ordinary skill in the art will recognize that many variations of these example modes could be achieved without deviating from the scope and spirit of the game.

Adventure Mode is the primary mode, and it allows the player to train with all the Peggle Masters. The player progresses through all the levels to become a Peggle Master. Adventure Mode is divided into 11 stages made up of five levels (or boards) each. The first 10 stages are presided over by specific Peggle Masters; the final stage is a set of five extra tricky Master Levels in which the player may select and use any Peggle Master's Magic Power. Once the player has completed Adventure mode the player may replay Adventure Mode at any time, and will be allowed to use any Peggle Master on any level. The stages and levels are:

---

Stage 1 - Bjorn Unicorn (Super Guide)

1.1 - Peggleland
1.2 - Slip and Slide
1.3 - Bjorn's Gazebo
1.4 - Das Bucket
1.5 - Snow Day
Stage 2 - Jimmy Lightning (Multiball)

2.1 - Birdy's Crib
2.2 - Buffalo Wings
2.3 - Skate Park
2.4 - Spiral of Doom
2.5 - Mr. Peepers
Stage 3 - Kat Tut (Pyramid Power)

3.1 - Scarab Crunch
3.2 - Infinite Cheese
3.3 - Ra Deal
3.4 - Croco-Gator Pit
3.5 - The Fever Level
Stage 4 - Splork (Space Blast)

4.1 - The Amoeban
4.2 - The Last Flower
4.3 - We Come In Peace
4.4 - Maid in Space
4.5 - Getting the Spare
Stage 5 - Claude Lobster (Flippers)

5.1 - Pearl Clam
5.2 - Insane Aquarium
5.3 - Tasty Waves
5.4 - Our Favorite Eel
5.5 - Love Story
Stage 6 - Renfield Pumpkin (Spooky Ball)

6.1 - Waves
6.2 - Spiderweb

---

-continued 6.3 - Blockers
6.4 - Baseball
6.5 - Vermin
Stage 7 - Tula Sunflower (Flower Power)

7.1 - Holland Oats
7.2 - I Heart Flowers
7.3 - Workin' From Home
7.4 - Tula's Ride
7.5 - 70 and Sunny
Stage 8 - Warren Rabbit (Lucky Spin)

8.1 - Win a Monkey
8.2 - Dog Pinball
8.3 - Spin Again
8.4 - Roll 'Em
8.5 - Five of a Kind
Stage 9 - Lord Cinderbottom (Fireball)

9.1 - The Love Moat
9.2 - Doom With a View
9.3 - Rhombi
9.4 - 9 Luft Balloons
9.5 - Twisted Sisters
Stage 10 - Master Hu (Zen Ball)

10.1 - Spin Cycle
10.2 - The Dude Abides
10.3 - When Pigs Fly
10.4 - Yang, Yin
10.5 - Zen Frog
Stage 11 - Master Levels 11.1 - Paw Reader
11.2 - EndofTime
11.3 - Billions and Billions
11.4 - Don't Panic
11.5 - Beyond Reason

---

Quick Play Mode lets the player select individual levels to play. The player can also hit the Random button in the lower right corner of the screen to have an individual level selected automatically. The player may only play levels already completed in Adventure Mode, and may only use Peggle Masters unlocked in Adventure Mode. However, unlike in Adventure Mode, the player is free to use any Peggle Master that is unlocked and not just the one associated with a particular level.

Duel Mode is unlocked once the player has completed Stage 1 of Adventure Mode. Duel Mode allows the player to compete in a two-player version of Peggle on any board the player has completed in Adventure Mode. The player can play against the computer or another person. The computer opponent has four difficulty settings: Easy (good for beginners); Normal (a well-rounded Duel Mode experience); Hard (for some extra challenge); and Master (the ultimate test for ultimate Peggle Masters). Duel Mode has slightly different rules than the single player modes. In Duel Mode, two players take turns shooting the ball. You must hit at least one orange peg on a shot; if you don't then you are penalized by losing 25% of your level score. Each player starts the game with five balls. Generally, there are no Free Balls in Duel Mode (with one exception: you can win them with Warren's Lucky Spin Magic Power). If you get a ball in the Free Ball Bucket, you will not receive a Free Ball; instead, you will receive a point award in the form of a Bucket Bonus Style Shot. Each time a player gets this style shot, the point value of this shot will increase for the next player to get it. Scoring 25,000, 75,000, or 125,000 points on a shot, while awesome, will also not award you a Free Ball in Duel Mode, but will award a modest point bonus to recognize achieving one of the three point thresholds. Furthermore, players are also not awarded a coin flip Free Ball in Duel Mode. The two green pegs appear one at a time rather than both together. When one is hit, the other will appear randomly on the board on the next shot. The game ends either when a player eliminates the last orange peg or when both players run out of balls. The player with the most points at the end of the game wins.

Challenge Mode is unlocked once the player has completed Adventure Mode. Challenge Mode presents you with extra difficult Peggle feats. There are 75 challenges, broken into 15 stages of five challenges each. They are:

---

35 Orange Pegs: Beat levels that have 35 orange pegs instead of the normal 25.

1.1 - 35 Orange Pegs (Bjorn's Gazebo board)
1.2 - 35 Orange Pets (Buffalo Wings board)
1.3 - 35 Orange Pests (Scarab Crunch board)
1.4 - 35 Orange Posts (We Come In Peace board)
1.5 - 35 Orange Clams (Pearl Clam Board)
45 Orange Pegs: Beat levels that have 45 orange pegs instead of the normal 25.

2.1 - 45 Little Victories (Birdy's Crib board)
2.2 - 45 Croco-Gators (Croco-Gator board)
2.3 - 45 Orange Things (The Amoeban board)
2.4 - Only 45 Calories (Insane Aquarium board)
2.5 - 45 is the New 25 (Spiderweb board)
55 Orange Pegs: Beat levels that have 55 orange pegs instead of the normal 25.

3.1 - Fifty-Five (The Fever Level board)
3.2 - 50 Plus 5 (The Last Flower board)
3.3 - 11 Times 5 (Love Story board)
3.4 - 1 + 2 + 3 + . . . + 10 (Waves board)
3.5 - Two Fives (Holland Oats board)
The 300K Cup: Score over 300,000 points on a board. These challenges can also be completed during the course of regular play in Adventure or Quick Play Mode.

4.1 - 300,000 Points (Snow Day board)
4.2 - 300 Grand (Skate Park board)
4.3 - 300 Kilopoints (Ra Deal board)
4.4 - 3000 Benjamins (We Come in Peace board)
4.5 - 300,000 Pointer (Our Favorite Eel board)
The 350K Open: Score over 350,000 points on a board. These challenges can also be completed during the course of regular play in Adventure or Quick Play Mode.

5.1 - 350,000 Points (Slip and Slide board)
5.2 - 350,000 Puntos (Infinite Cheese board)
5.3 - 350,000 Punti (The Amoeban board)
5.4 - 350,000 Punten (Love Story board)
5.5 - 350,000 Punkte (Win a Monkey board)
The 400K Bowl: Score over 400,000 points on a board. These challenges can also be completed during the course of regular play in Adventure or Quick Play Mode.

6.1 - 400,000 Points (Birdy's Crib board)
6.2 - 40,000 P-Babies (The Last Flower board)
6.3 - 4,000 Pecans (Pearl Clam board)
6.4 - 400 P-Dogs (Vermin board)
6.5 - 40 Peeps (The Love Moat board)
In The Clear: Clear all of the pegs. Not just the orange ones, but also all of them. These challenges can also be completed during the course of regular play in Adventure or Quick Play Mode.

7.1 - Clear as a Bell (Peggleland board)
7.2 - Clear as a Bird (Slip and Slide board)
7.3 - Clear as a Fiddle (Bjorn's Gazebo board)
7.4 - Clear as Silk (Das Bucket board)
7.5 - Clear as Pie (Snow Day board)
Clearly Impossible!: Clear all of the pegs. Not just the orange ones, but also all of them. These challenges can also be completed during the course of regular play in Adventure or Quick Play Mode.

8.1 - All Clear (Buffalo Wings board)
8.2 - Crystal Clear (Scarab Crunch board)
8.3 - See Through (Pearl Clam board)
8.4 - Translucent (Spiderweb board)
8.5 - No Pegs Left (I Heart Flowers board)
Dueling: Beat computer opponents in Duel Mode, normal difficulty.

9.1 - Bjorn's House (Das Bucket board)
9.2 - Jimmy's Park (Birdy's Crib board)
9.3 - Kat Tuts Empire (Infinite Cheese board)
9.4 - Splork's Planet (We Come in Peace board)
9.5 - Claude's Pool (Insane Aquarium board)
Serious Dueling: Beat computer opponents in Duel Mode, hard difficulty.

10.1 - Renfieid's Coffin (Baseball board)
10.2 - Tula's Greenhouse (Holland Oats board)
10.3 - Warren's Carnival (Spin Again board)
10.4 - Cinder's Castle (The Love Moat board)
10.5 - Hu's Temple (Yang, Yin board)
Duel to the Death: Beat computer opponents in Duel Mode, master difficulty.

11.1 - Renfield's Treat (Waves board)
11.2 - Tula's Smackdown (Tula's Ride board)
11.3 - Warren's Game (Spin Again board)
11.4 - Cinder's Roast (Doom With a View board)
11.5 - Hu's Next Victory (Spin Cycle board)
Multilevel Challenge: Beat multiple levels in a row.

12.1 - 2 for the Road (two random boards)
12.2 - 3 for Luck (three random boards)
12.3 - 4 to Get Better (four random boards)
12.4 - 5 to Get Stuck (five random boards)
12.5 - 6 Times the Fun (six random boards)
Three Level Duel: Beat the computer's cumulative score in Duel Mode over three random boards.

13.1 - Normal Tri Duel (normal difficulty)
13.2 - Hard Tri Duel (hard, normal and hard difficulty)
13.3 - Harder Tri Duel (master, normal and hard difficulty)
13.4 - Severe Tri Duel (hard, master and hard difficulty)
13.5 - Master Tri Duel (master difficulty)
Multilevel Score: Beat a target cumulative score over three levels.

14.1 - 750,000 Points (Buffalo Wings, Scarab Crunch and We Come in Peace boards)
14.2 - 800,000 Points (Pearl Clam, Holland Oats and Love Moat boards)
14.3 - 850,000 Points (Skate Park, Love Story and Waves boards)
14.4 - 900,000 Points (Peggleland, Bjorn's Gazebo and Slip and Slide boards)
14.5 - One Million Points (Snow Day, Birdy's Crib and The Fever Level boards)
Insane Challenges: Grab bag of extremely difficult challenges.

15.1 - 2 Balls Left (beat Peggleland board starting with only 2 balls)
15.2 - Last Ball (beat Das Bucket board starting with only 1 ball)
15.3 - Ten Ball Trial (beat Pegoland, Slip and Slide and Das Bucket boards starting with only 10 balls)
15.4 - 750,000? (score over 750,000 points on a level of your choice). This challenge can also be completed during the course of regular play in Adventure or Quick Play Mode.
15.5 - The Decathlon (beat 10 random levels in a row)

---

Every challenge you beat earns you a special Peggle Master wreath. Beat all of the challenges to win the title of Peggle Grand Master.

Scoring

Scoring starts with a shot score based on the pegs a player removes in a single shot. The base value for a blue peg is 10 points. The base value for an orange peg is 100 points. The base value for a purple peg is 500 points. The base value for a green peg is 10 points. Every peg a player hits on a shot adds to a subtotal score. The shot score is the subtotal score multiplied by the number of pegs hit. It does not matter in which order the pegs are hit.

Example 1

On your first shot, you hit blue (10), orange (100), blue (10), blue (10), orange (100), orange (100), green (10), purple (500), and blue (10). Your subtotal score would be 850 points (10+100+10+10+100+100+10+500+10). You hit nine pegs, so your shot score would be 7650 points (850 points×9 pegs). The value of all pegs goes up as orange pegs are removed. The Fevermeter on the right side of the board shows the current score multiplier. The multiplier is determined as follows.

| Orange Pegs Hit | Orange Pegs Remaining | Multiplier |
| --- | --- | --- |
| 0 | 25 | 1× |
| 10 | 15 | 2× |
| 15 | 10 | 3× |
| 19 | 6 | 5× |
| 22 | 3 | 10× |

Example 2

You have already hit 13 orange pegs and there are 12 remaining. You shoot and hit blue, blue, orange, orange, orange, purple, orange, blue, blue, and orange. The second orange peg you hit would bump the multiplier up from 2× to 3×, so the subtotal score would be 20 (blue @ 2×)+20 (blue @ 2×)+200 (orange @ 2×)+300 (orange @ 3×)+300 (orange @ 3×)+1500 (purple @ 3×)+300 (orange @ 3×)+30 (blue @ 3×)+30 (blue @ 3×)+300 (orange @ 3×) for a subtotal of 3,000 points. You hit ten pegs, so your final shot score would be 30,000 points (3,000 points×10 pegs).

Next, a Fever Score is calculated based on the points earned on the last shot. The Fever Score is composed of the Final shot points plus Bonus Hole points plus any Extra Ball Bonus. Hitting the final orange peg sets off Extreme Fever. Scoring for the last shot taken is calculated the same way as other shot points (Subtotaled value of pegs hit×Number of pegs hit). Any blue or green peg hit after Fever is worth 1,000 points; the purple peg is worth 10,000 points. At the end of Fever, the ball drops into one of five Bonus Holes on the bottom of the screen. The Bonus Holes are worth, from left to right, 10,000, 50,000, 100,000, 50,000, and 10,000 points. If the player achieves Ultra Extreme Fever by clearing all pegs, the bonus holes will all award 100,000 points. The player receives 10,000 points per extra ball left over. Magic Powers can be active or activated during Fever (e.g. if Multiball is active, both balls will score points for landing in Bonus Holes).

Next, any Style Points are added to the score. As previously discussed in the Style Shots section above, certain cool shots earn additional points. These points do not contribute to earning free balls, but they do add to the level score. Style shots score differently in Duel Mode than in the other modes, and some style shots cannot be performed in Duel Mode. Following is the scoring for style shots.

| Style Shot | Points | Duel Mode points |
| --- | --- | --- |
| Freeball Skills | 5,000 | 2,500 |
| Long Shot | 25,000 | 5,000 |
| Super Long Shot | 50,000 | 10,000 |
| Kick the Bucket | 25,000 | 5,000 |
| Lucky Bounce | 25,000 | 5,000 |
| Mad Skillz | 25,000 | 5,000 |
| Crazy Mad Skillz | 100,000 | 10,000 |
| Extreme Slide | 50,000 | 5,000 |
| Orange Attack | 50,000 | 5,000 |
| Cool Clear | 50,000 | 5,000 |
| Bucket Bonus | (Duel Mode only) | 5,000 |
| Multiball Madness | 25,000 | 5,000 |
| Free Ball Frenzy | 100,000 | 10,000 |
| Pyramid Pickup | 10,000 | 5,000 |
| Flipper Maniac | 25,000 | 5,000 |
| Hat Trick | 10,000 | 2,500 |
| Hot Stuff | 25,000 | 5,000 |
| Double Guide | 25,000 | |
| Triple Play | 25,000 | |
| Pyramid Pileup | 25,000 | |
| Big Bang | 25,000 | |
| Flip Out | 25,000 | |
| Spooktacular | 25,000 | |
| Petal to the Metal | 25,000 | |
| Spin Again | 25,000 | |
| Great Balls of Fire | 25,000 | |
| Zen Maniac | 25,000 | |

Next, the level score is determined. The level score is all shot scores+Fever score+style points, and it is displayed in the score bar to the upper left of the Ball Launcher.

Finally, the total score is determined as a running tally of the level scores, and is displayed in the score bar to the upper right of the Ball Launcher. In Adventure Mode, if a player finishes a level on her first try, the player receives 100,000 additional points added to the total score; on the 2nd try, 50,000 points; on the 3rd try, 25,000 points; and on the 4th or more tries, no bonus points. In addition, the player receives a 1,000,000-point bonus if you complete Adventure Mode without losing a level. This end-of-mode bonus is reduced by 200,000 points each time a player requires an additional attempt to complete a level.

The peg values in Duel Mode are the same as in Adventure Mode, as is the point multiplier and the method of calculating shot scores (subtotaled value of pegs×number of pegs hit). Unlike in Adventure or Quick Play, the Bonus Holes in Duel are worth, from left to right, 5,000, 25,000, 50,000, 25,000, and 5,000 points. There is no Ultra Extreme Fever in Duel Mode, and the bonus for extra balls left over is 5,000 points instead of 10,000.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled," as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. In addition, while processes or blocks are at times shown as being performed in series, these processes or blocks may instead be performed in parallel, or may be performed at different times.

The following examples indicate just a few of the many alternative variations that are possible. The launcher may be able to be moved along a track at the top of the board rather than fixed in the middle. Backdrops may be created dynamically as opposed to pre-rendered. Levels may be created dynamically. Pegs may have different shapes (e.g. triangular, rotating crosses, etc.). The player may be able to control the ball catcher. The player may have the ability to use a controllable paddle or trampoline (in place of the ball catcher) to bounce the ball back up. The player may have the ability to shoot multiple balls at once. The player may be able to control/manipulate the board while the ball is in play. The player may be able to influence the ball mid-bounce to affect its nature (e.g., nudge it, temporarily affect local gravity, etc.). The player may be able to select a different "material" for the ball that affects how it plays. The "material" of the pegs may vary to affect the bounciness or other attributes of the pegs. Peggle may provide the player with a power-up storage that the player can activate when needed. The player may be able to buy power-ups or ball variants using points earned in-game. Peggle may number the orange pegs and require the player to clear them in a sequence, either in one shot or in successive shots. Peggle may provide a "Call the shot" bonus, where the player bets on which orange pegs she is going to hit for bonus points. The player may be able to select portions of the board to increase/decrease the strength of the gravity. The player may be able to shift or rotate the board of pegs after launching the ball. Peggle may provide simultaneous network or same-console multiplayer (as opposed to hot-seat Duel mode).

In addition, there may be unlockable Extreme Fevers (e.g., having different themes/music when the player finishes a level). Peggle may provide a progressive jackpot for fever, for example, such that the values of the fever buckets go up the longer the ball is in the air in Fever and the more pegs it hits. Peggle may provide a persistent element from level to level, e.g. a player building up credits by certain game play actions, and then receiving an opportunity to spin for the jackpot when the player has enough credits. Peggle may have a bonus underground level so that when the player gets the ball in the 100 k bucket, the ball continues to travel to a new screen below (e.g., screen scrolls down to reveal underground level). Peggle may have bumpers that give points (rising point value each time it is hit by the ball). Peggle may have bonus items that fly across the screen and are worth points if hit. Peggle may also have extra bonus pegs placed in the level based on the last shot. Peggle may include a level/game editor that allows people to not only create new levels, but also new types of games using the ball physics engine and some included objects. Peggle may interact with other systems inside or outside of the game. For example, points earned could be used to gamble or invest in a mock stock market between levels/stages as part of a meta-game. Those of ordinary skill in the art will appreciate that these and many other variations can be achieved with the system described.

The teachings of the invention provided herein can be applied to other systems, not necessarily the system described above. The elements and acts of the various embodiments described above can be combined to provide further embodiments.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A computer-readable storage device storing instructions that, if executed by a computing system, cause the computing system to perform operations for playing a game comprising a plurality of levels, the operations comprising:
   for each of a set of levels of the plurality of levels,
      placing a first subset of removable pegs according to a layout specified by the level,
         wherein the first subset of removable pegs corresponds to pegs that are to be removed to complete the level,
      placing a second subset of removable pegs according to the layout specified by the level,
         wherein the second subset of removable pegs corresponds to pegs that need not be removed to complete the level,
      placing a ball launcher having a location and an adjustable direction for releasing balls,
         wherein the location remains fixed through the duration of the level,
      receiving an indication to launch a ball from the ball launcher and release the ball, and
      determining a trajectory of the ball through the placed set of removable pegs based on the location and direction from which the ball was launched from the ball launcher.

2. The computer-readable storage device of claim 1 wherein each level is associated with an artistic backdrop and wherein the layout is based in part on the artistic backdrop.

3. The computer-readable storage device of claim 1 wherein the game has multiple available types of pegs and wherein the types of pegs placed is selected randomly from among the multiple types.

4. The computer-readable storage device of claim 1 wherein at least some removable pegs are circular and spaced apart and wherein at least some removable pegs are rectilinear bricks such that they are more likely to block the path of the ball.

5. The computer-readable storage device of claim 1 wherein at least some of the placed removable pegs move.

6. The computer-readable storage device of claim 1, the operations further comprising:
receiving a selection of a character from a predefined set of characters, wherein each character has a special ability that alters the game play.

7. The computer-readable storage device of claim 6, wherein the special ability of at least one character is to increase the size of a ball.

8. The computer-readable storage device of claim 6, the operations further comprising:
placing a ball catcher, wherein the ball catcher and the ball launcher are placed at opposite edges of a screen.

9. The computer-readable storage device of claim 8, wherein the special ability of at least one character is to add bumpers to the sides of the ball catcher.

10. The computer-readable storage device of claim 6, wherein the special ability of at least one character is to spawn an additional ball.

11. The computer-readable storage device of claim 1, the operations further comprising:
in response to determining that the ball is to contact the last removable peg of the first subset of removable pegs, zooming in on the ball, and
invoking a slow-motion mode of the game.

12. The computer-readable storage device of claim 1, the operations further comprising:
receiving from a player prior to a distinguished ball being launched a selection of at least one peg; and
in response to determining that the distinguished ball has contacted the selected at least one peg, awarding the player a bonus.

13. The computer-readable storage device of claim 1, the operations further comprising:
in response to determining that the first subset of removable pegs have been removed, selecting a next level.

14. A method, performed by a computer having at least one processor, for playing a game comprising multiple levels, the method comprising:
with the at least one processor, determining a number of pegs to place for a level of the game,
wherein each peg for the level has a type; and
receiving input from a player of the game system;
releasing, from a ball launcher, a ball based on the received input,
wherein the ball launcher has a user-adjustable direction and a fixed location for each level of the game; and
with the at least one processor, determining a score based upon the type and number of pegs contacted by the released ball.

15. The method of claim 14 wherein a fixed location of the ball launcher for a first level of the game is different from a fixed location of the ball launcher for a second level of the game.

16. The method of claim 14, further comprising:
providing audible feedback indicating the number of pegs contacted by the ball.

17. The method of claim 14 wherein a first type corresponds to removable pegs that are to be removed to complete the level and a second type corresponds to removable pegs that need not be removed to complete the level.

18. A system, having a memory, for controlling a computer system to display a game, the system comprising:
a component configured to determine a layout of removable pegs on a game board,
wherein the removable pegs have multiple types, and
wherein at least one type of removable peg does not need to be removed to complete the game board;
a component configured to receive from the player a trajectory to which to launch a ball;
a component configured to determine the path of the ball through the pegs; and
a component configured to, in response to determining that the ball has contacted a removable peg, identify the peg for removal,
wherein at least one of the components comprises computer-executable instructions stored in the memory for execution by the system.

19. The system of claim 18, further comprising:
a component configured to calculate a score based in part on the number and type of pegs contacted by the ball.

20. The system of claim 18, further comprising:
a component configured to increase a multiplier used in calculating the score based in part on the number of pegs contacted by the ball during a single turn.

* * * * *

UNITED STATES PATENT AND TRADEMARK OFFICE
CERTIFICATE OF CORRECTION

PATENT NO. : 8,398,476 B1  
APPLICATION NO. : 13/346812  
DATED : March 19, 2013  
INVENTOR(S) : Sukhbir Sidhu et al.

Page 1 of 1

It is certified that error appears in the above-identified patent and that said Letters Patent is hereby corrected as shown below:

In the Specification

In column 9, line 61, delete "Fevemeter," and insert -- Fevermeter, --, therefor.

In column 16, line 8, delete "Workin' From Home" and insert -- Working' From Home --, therefor.

In column 18, line 8, delete "Kat Tuts" and insert -- Kat Tut's --, therefor.

In column 18, line 13, delete "Renfieid's" and insert -- Renfield's --, therefor.

Signed and Sealed this  
Second Day of July, 2013

Teresa Stanek Rea  
*Acting Director of the United States Patent and Trademark Office*